(12) United States Patent
Tangudu et al.

(10) Patent No.: US 12,261,491 B2
(45) Date of Patent: Mar. 25, 2025

(54) AIRCRAFT ELECTRIC MOTOR

(71) Applicant: Hamilton Sundstrand Corporation, Charlotte, NC (US)

(72) Inventors: Jagadeesh K. Tangudu, South Windsor, CT (US); Beata I. Wawrzyniak, South Windsor, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 233 days.

(21) Appl. No.: 17/718,929

(22) Filed: Apr. 12, 2022

(65) Prior Publication Data
US 2023/0327531 A1 Oct. 12, 2023

(51) Int. Cl.
H02K 16/04 (2006.01)
B64D 27/24 (2006.01)
H02K 1/18 (2006.01)
H02K 1/2793 (2022.01)
H02K 7/00 (2006.01)
B64U 50/19 (2023.01)

(52) U.S. Cl.
CPC ............ H02K 16/04 (2013.01); B64D 27/24 (2013.01); H02K 1/182 (2013.01); H02K 1/2793 (2013.01); H02K 7/003 (2013.01); B64U 50/19 (2023.01)

(58) Field of Classification Search
CPC . H02K 9/12; H02K 7/116; H02K 1/20; H02K 1/30
USPC ....... 310/49.22, 156.26, 156.37, 156.59, 266
See application file for complete search history.

(56) References Cited

U.S. PATENT DOCUMENTS

| 5,829,542 A | 11/1998 | Lutz |
| 6,828,710 B1 * | 12/2004 | Gabrys ............... H02K 21/24 |
| | | 310/260 |
| 7,554,241 B2 | 6/2009 | Rao |
| 7,802,614 B2 | 9/2010 | Elnar |
| 7,851,956 B2 | 12/2010 | Jezek |

(Continued)

FOREIGN PATENT DOCUMENTS

| CN | 110380555 A * | 10/2019 | ........... H02K 1/2753 |
| DE | 102011012454 A1 | 8/2012 | |

(Continued)

OTHER PUBLICATIONS

European Search Report for European Application No. 23156062.4; Date of Action: Aug. 31, 2023, 15 pages.

*Primary Examiner* — Jose A Gonzalez Quinones
(74) *Attorney, Agent, or Firm* — CANTOR COLBURN LLP

(57) ABSTRACT

Aircraft electric motors include a rotor comprising a plurality of magnet segments arranged on a frame of the rotor, the rotor defining an internal cavity radially inward from the plurality of magnet segments, an output shaft operably coupled to the rotor, a stator comprising at least one winding wrapped about a support structure, the stator arranged within the internal cavity of the rotor, and a stator support configured to supply at least a current into the at least one winding, wherein the support structure is structurally supported on the stator support. The magnet segments are symmetrically arranged about the stator to balance axial forces applied to the rotor when a current is induced within the at least one winding and maintain a gap between the plurality of magnet segments and the at least one winding.

19 Claims, 13 Drawing Sheets

(56) References Cited

U.S. PATENT DOCUMENTS

| | | |
|---|---|---|
| 10,035,561 B2 | 7/2018 | Spaggiari |
| 10,766,566 B2 | 9/2020 | Capozzella et al. |
| 10,826,338 B2 | 11/2020 | Woolmer |
| 2007/0205682 A1* | 9/2007 | Choi ................... H02K 7/14 |
| | | 310/266 |
| 2013/0062466 A1 | 3/2013 | Sweet et al. |
| 2013/0162112 A1 | 6/2013 | Loefel et al. |
| 2021/0234446 A1* | 7/2021 | Shcherbakov ........... H02K 1/20 |
| 2021/0384782 A1 | 12/2021 | Tsuchiya et al. |
| 2022/0094232 A1 | 3/2022 | Kislev et al. |
| 2022/0320957 A1* | 10/2022 | Tangudu ................ B64D 27/24 |

FOREIGN PATENT DOCUMENTS

| | | | |
|---|---|---|---|
| JP | 61293132 A | * 12/1986 | |
| WO | WO-2014116079 A1 | * 7/2014 | ........... D06F 37/206 |

\* cited by examiner

AIRCRAFT ELECTRIC MOTOR

STATEMENT OF FEDERAL SUPPORT

This invention was made with Government support under contract number DE-AR0001351, awarded by the Department of Energy. The Government has certain rights in the invention.

BACKGROUND

The present disclosure relates to electric motors, and more particularly, to electric motor assemblies with high efficiency and power density having relatively low weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments of the present disclosure, aircraft electric motors are provided. The aircraft electric motors include a rotor comprising a plurality of magnet segments arranged on a frame of the rotor, the rotor defining an internal cavity radially inward from the plurality of magnet segments, an output shaft operably coupled to the rotor, a stator comprising at least one winding wrapped about a support structure, the stator arranged within the internal cavity of the rotor, and a stator support configured to supply at least a current into the at least one winding, wherein the support structure is structurally supported on the stator support. The magnet segments are symmetrically arranged about the stator to balance axial forces applied to the rotor when a current is induced within the at least one winding and maintain a gap between the plurality of magnet segments and the at least one winding.

In addition to one or more of the features described herein, or as an alternative, further embodiments of the aircraft electric motors may include that the frame of the rotor comprises a first rotor shell and a second rotor shell coupled to each other, wherein the plurality of magnet segments are supported on the first and second rotor shells.

In addition to one or more of the features described herein, or as an alternative, further embodiments of the aircraft electric motors may include a fastener configured to join the first rotor shell to the second rotor shell.

In addition to one or more of the features described herein, or as an alternative, further embodiments of the aircraft electric motors may include that the frame comprises an opening on a radially interior side and the stator support extends radially inward from the stator.

In addition to one or more of the features described herein, or as an alternative, further embodiments of the aircraft electric motors may include that the frame comprises an opening on a radially exterior side and the stator support extends radially outward from the stator.

In addition to one or more of the features described herein, or as an alternative, further embodiments of the aircraft electric motors may include that the comprises one or more stator connections.

In addition to one or more of the features described herein, or as an alternative, further embodiments of the aircraft electric motors may include that the one or more stator connections include an electrical connection and a cooling fluid connection.

In addition to one or more of the features described herein, or as an alternative, further embodiments of the aircraft electric motors may include that the at least one winding and the plurality of magnet segments are arranged to have a dominant axial flux.

In addition to one or more of the features described herein, or as an alternative, further embodiments of the aircraft electric motors may include a cooling system comprising an annular heat exchanger arranged about the rotor.

In addition to one or more of the features described herein, or as an alternative, further embodiments of the aircraft electric motors may include a motor housing arranged radially inward from the heat exchanger, the motor housing defining a rotor-stator cavity with the rotor and stator arranged therein.

In addition to one or more of the features described herein, or as an alternative, further embodiments of the aircraft electric motors may include a gear assembly arranged to operably coupled the rotor to the output shaft.

In addition to one or more of the features described herein, or as an alternative, further embodiments of the aircraft electric motors may include at least one power module system configured to control operation of the aircraft electric motor.

In addition to one or more of the features described herein, or as an alternative, further embodiments of the aircraft electric motors may include a cooling system comprising a header configured to direct cooling fluid to the one or more windings of the stator from a heat exchanger.

In addition to one or more of the features described herein, or as an alternative, further embodiments of the aircraft electric motors may include a pump configured to circulate the cooling fluid through the header and the heat exchanger.

According to some embodiments, aircraft are provided. The aircraft include at least one engine and at least one electric motor configured to rotationally drive a component of the aircraft. The at least one electric motor includes a rotor comprising a plurality of magnet segments arranged on an interior surface of a frame of the rotor, an output shaft operably coupled to the rotor and configured to be rotationally driven by rotation of the rotor, a stator comprising at least one winding wrapped about a support structure, the winding arranged within the rotor, and a stator support configured to supply at least a current into the at least one winding, wherein the support structure is structurally supported on the stator support. The magnet segments are symmetrically arranged about the stator to balance axial forces applied to the rotor when a current is induced within the at least one winding and maintain a gap between the plurality of magnet segments and the at least one winding.

In addition to one or more of the features described herein, or as an alternative, further embodiments of the aircraft may include that the frame of the rotor comprises a first rotor shell and a second rotor shell coupled to each other.

In addition to one or more of the features described herein, or as an alternative, further embodiments of the aircraft may include a fastener configured to join the first rotor shell to the second rotor shell.

In addition to one or more of the features described herein, or as an alternative, further embodiments of the aircraft may include that the frame comprises an opening on a radially interior side and the stator support extends radially inward from the stator.

In addition to one or more of the features described herein, or as an alternative, further embodiments of the aircraft may include that the frame comprises an opening on a radially exterior side and the stator support extends radially outward from the stator.

In addition to one or more of the features described herein, or as an alternative, further embodiments of the aircraft may include that the at least one winding and the plurality of magnet segments are arranged to have a dominant axial flux.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
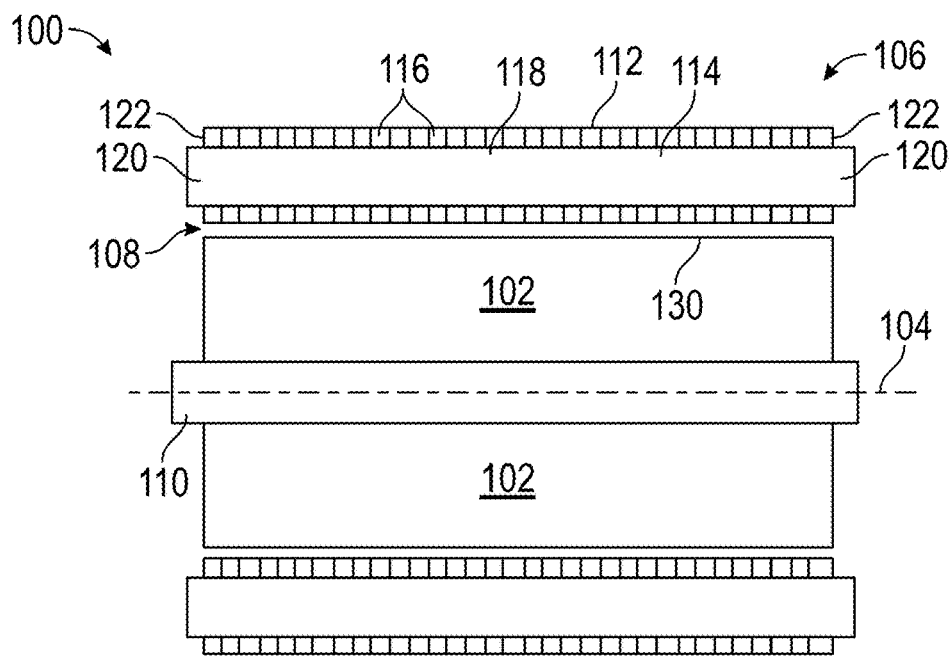
FIG. 1A is a partial view of an embodiment of electric motor.
Figure 1B:
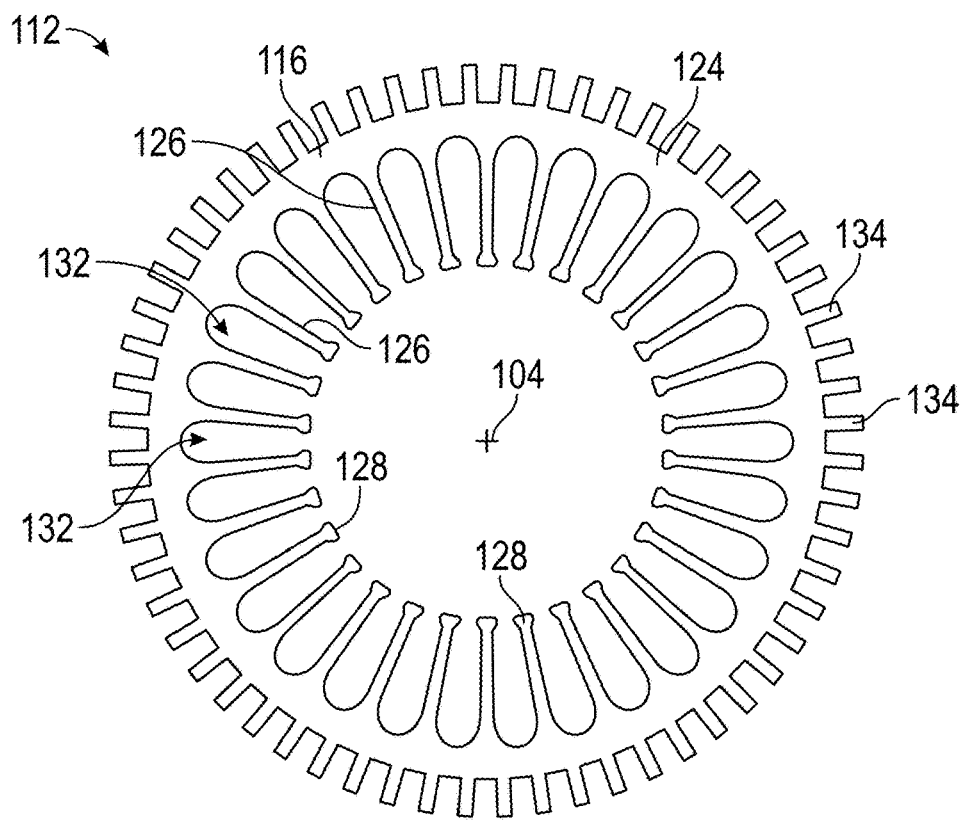
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween.

Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
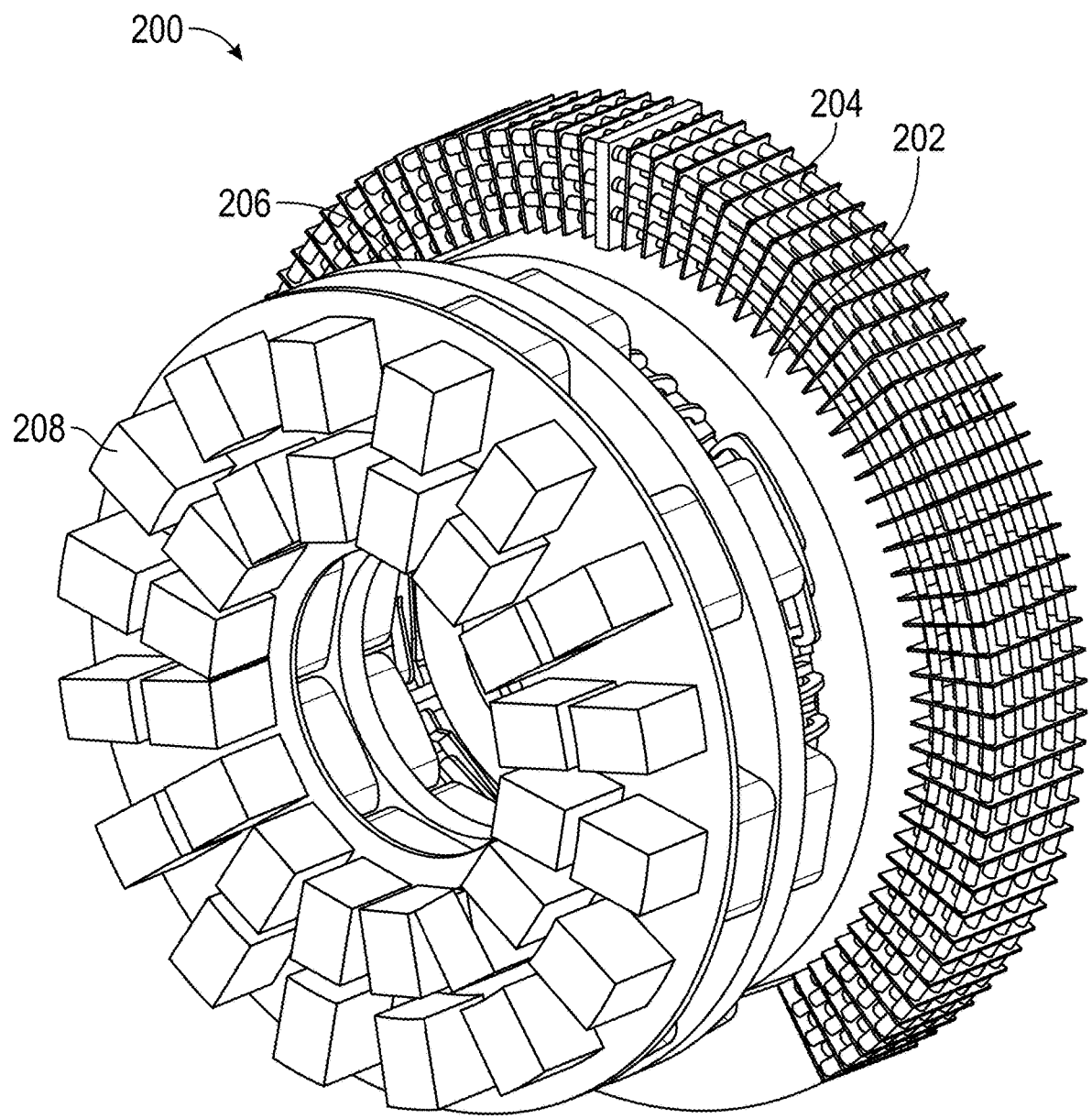
FIG. 2A is a schematic illustration of an aircraft electric motor in accordance with an embodiment of the present disclosure.
Figure 2B:
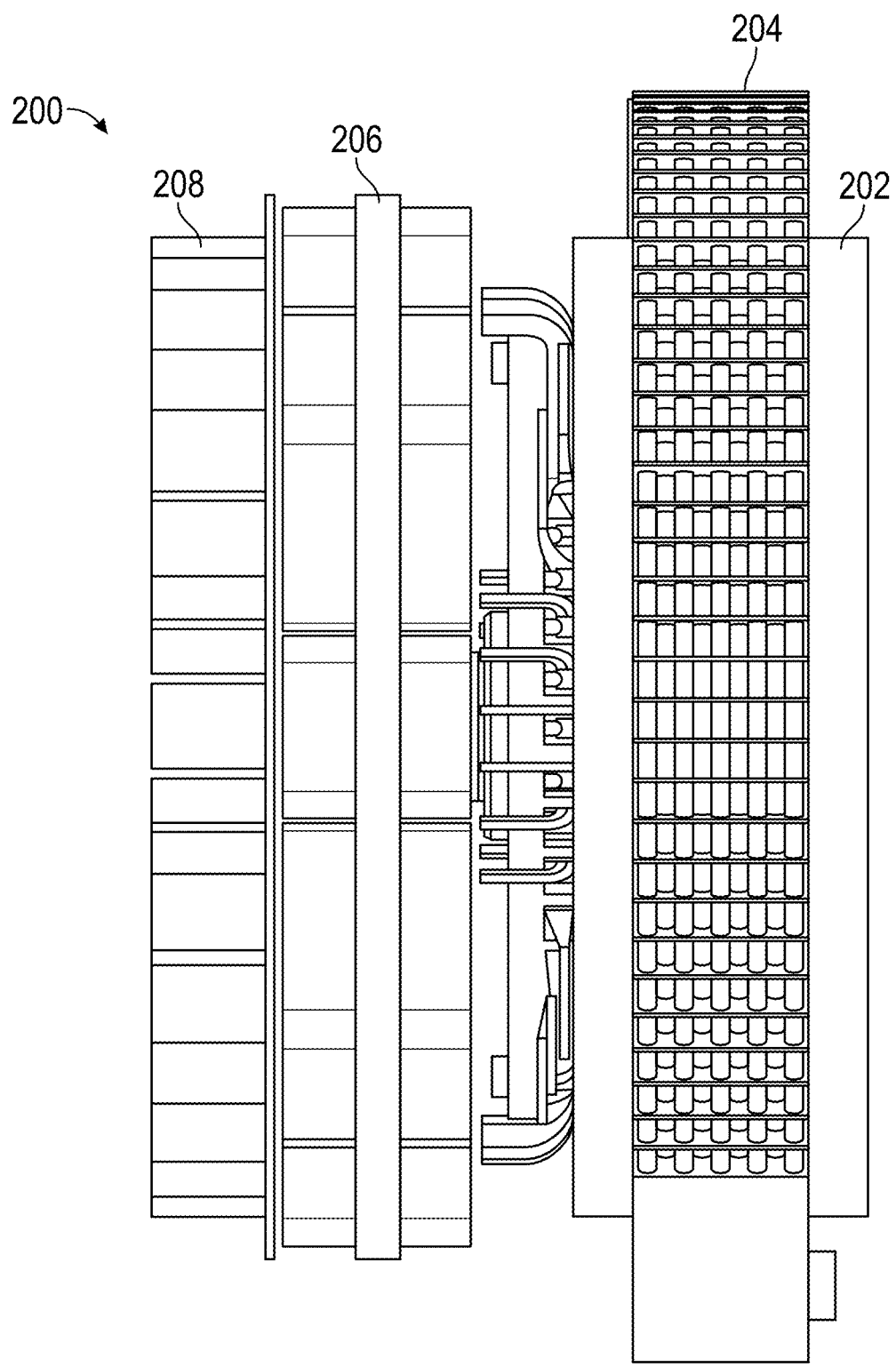
FIG. 2B is a side elevation view of the aircraft electric motor of FIG. 2A.
Figure 2C:
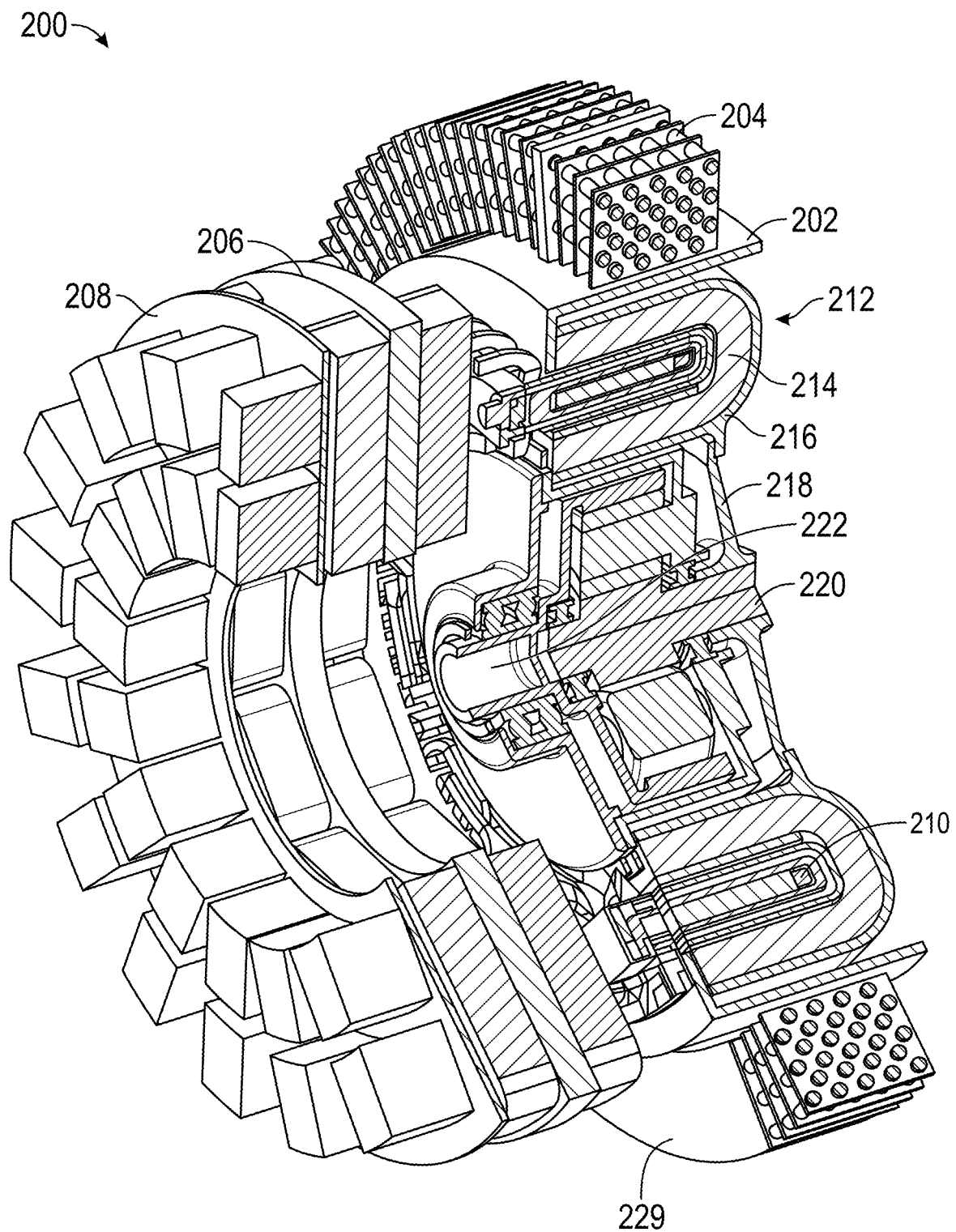
FIG. 2C is a partial cut-away illustration of the aircraft electric motor of FIG. 2A.
Figure 2D:
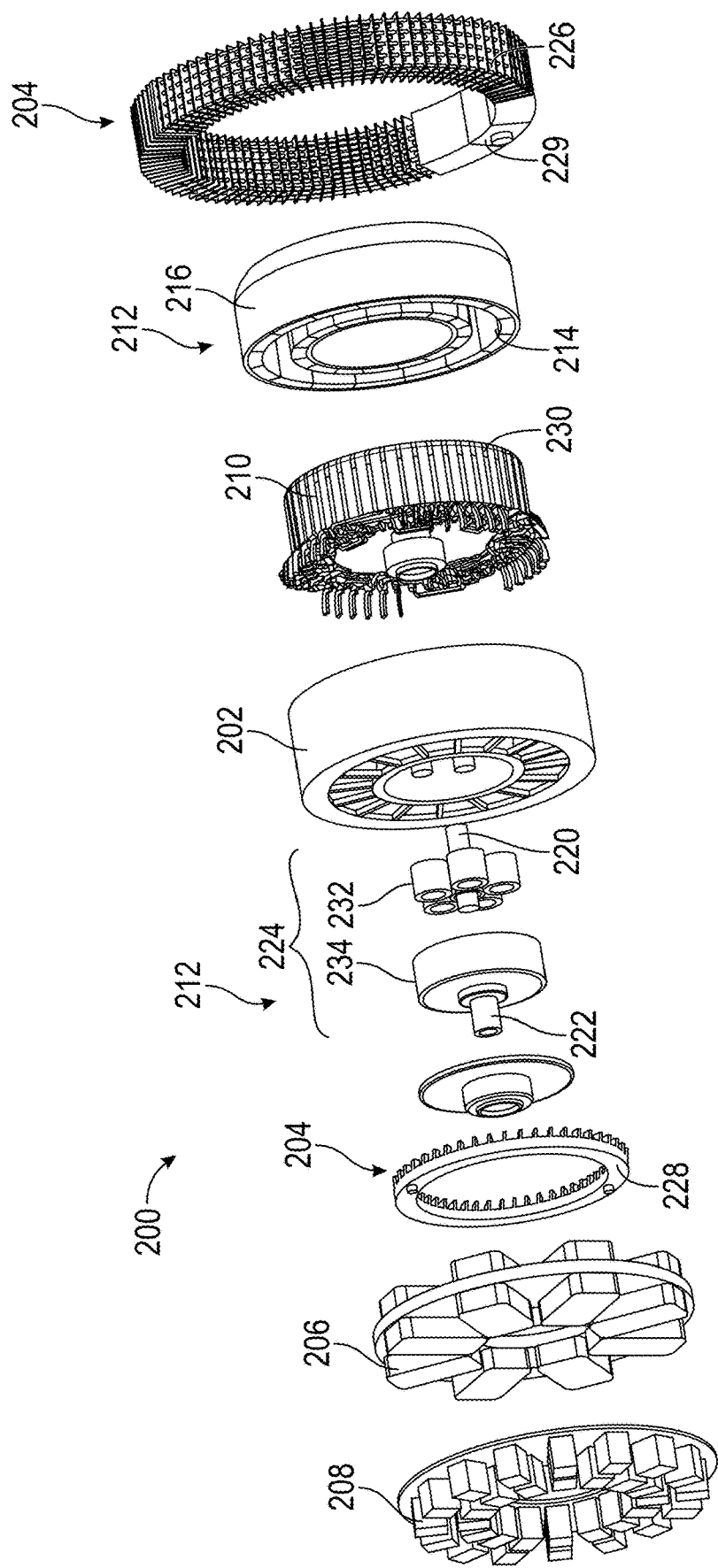
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular or annular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that may enable control and operation of the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
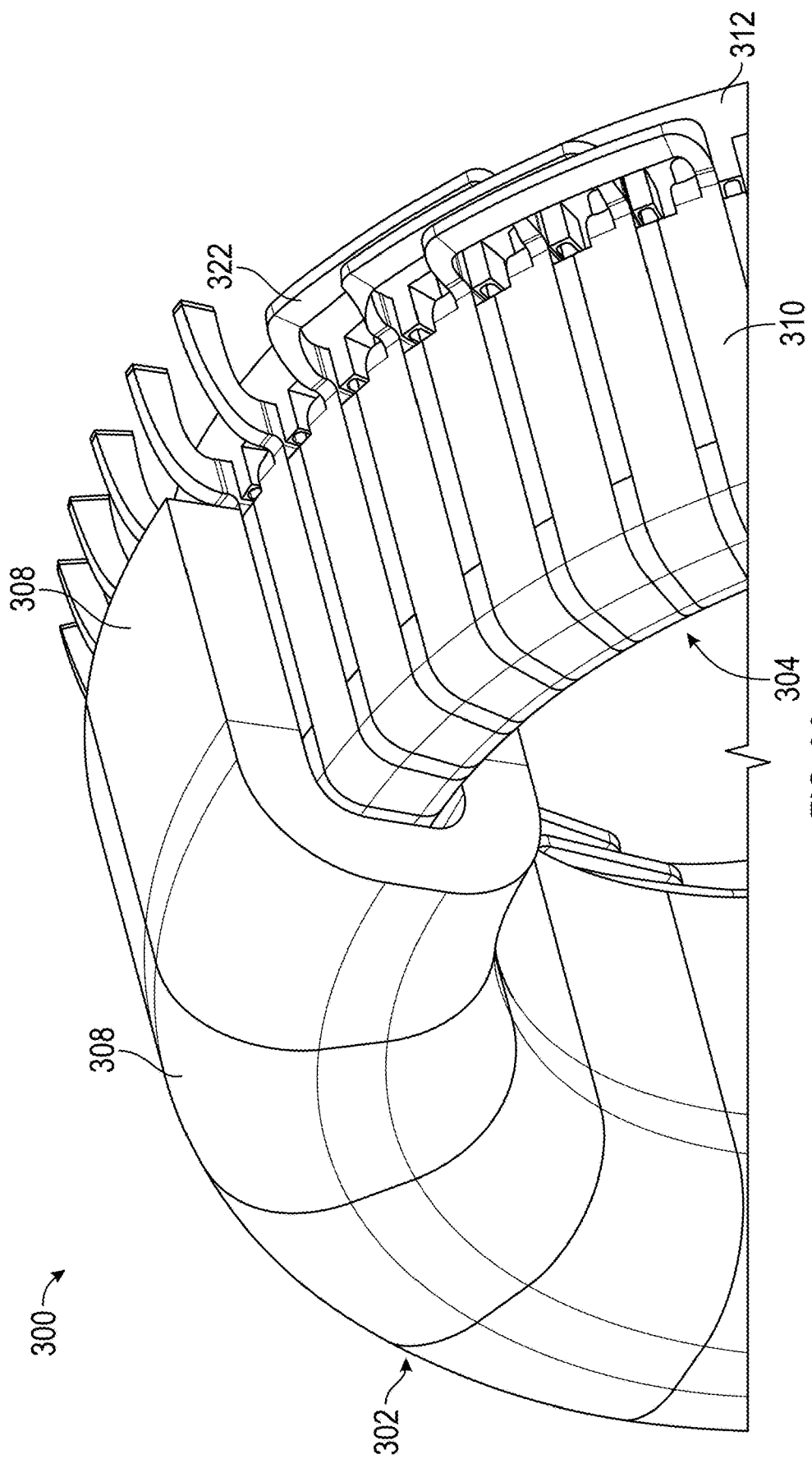
FIG. 3A is a schematic illustration of a rotor and stator of an aircraft electric motor in accordance with an embodiment of the present disclosure.
Figure 3B:
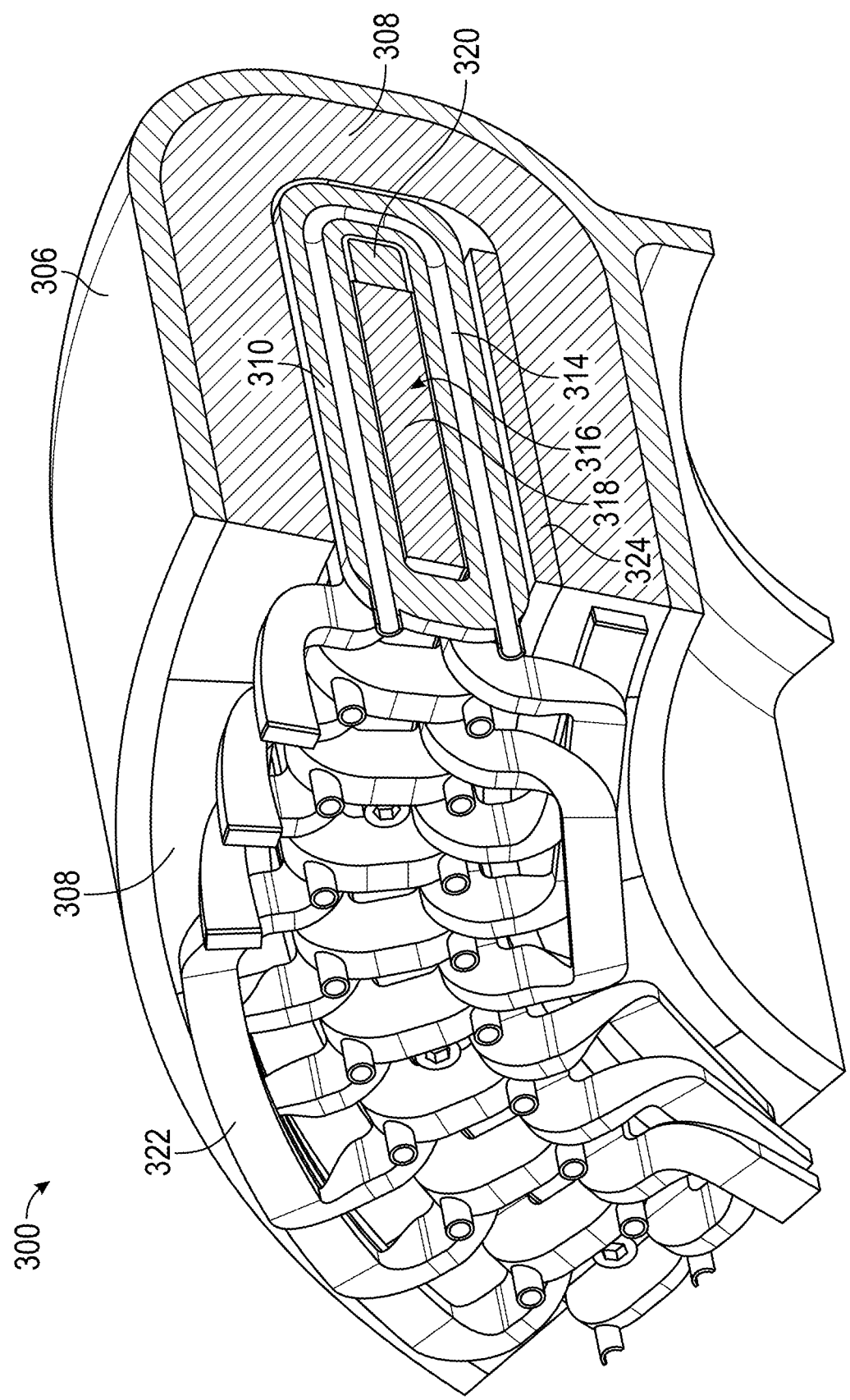
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B.

The windings 310 may be wrapped about a support structure 316. The support structure 316, in some embodiments and as shown in FIG. 3B, may include a laminate portion 318 and a magnetic portion 320. In some such embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 308 include end connections 322 and may be electrically connected to one or more power module systems of the aircraft electric motor, such as shown above.

As shown in FIG. 3B, the magnets 306 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact enables free rotation of the rotor 302 relative to the stator 304 during operation.

In aviation-class electric motors, such as described above, a high-power density can be achieved by maximizing torque at given speeds. One way to achieve maximum torque is to increase the current in the windings. However, by increasing current through the stator windings requires additional cooling, which can add weight, increase complexity, etc. Another mechanism for increasing torque may be achieved by improving utilization of the magnetic materials of the rotor. For example, increasing a proportion of magnetically active materials to non-active (e.g., not participating in torque production) can increase torque of the motor. In the arrangement of the above described configurations, one side of the end windings are positioned within a generally U-Shaped magnet arrangement, and thus the is no symmetry in an axial direction. This may result in an unbalancing of axial forces, particularly when maintaining an airgap between the stator and rotor. In topologies where this impact unbalance of force is high, the size of bearings that support the axial loads may be prohibitive. Simultaneously, the radial forces (normal to the airgap circumference) will be mostly balanced due to rotor symmetry (e.g., symmetry of the U-Shape arms of the magnets, as shown in FIGS. 2C, 3B).

Figure 4A:
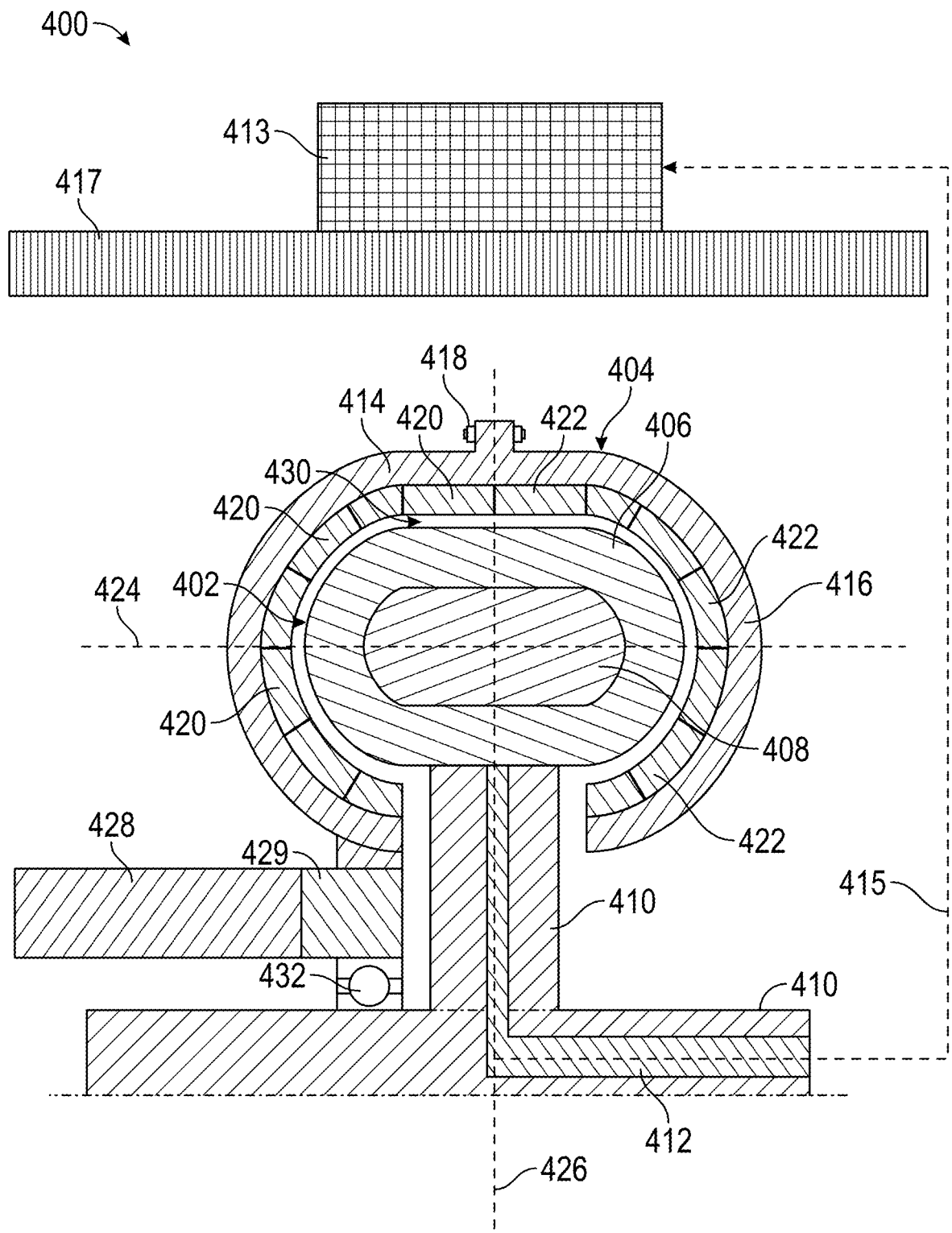
FIG. 4A is a schematic illustration of a portion of an electric motor in accordance with an embodiment of the present disclosure.
Figure 4B:
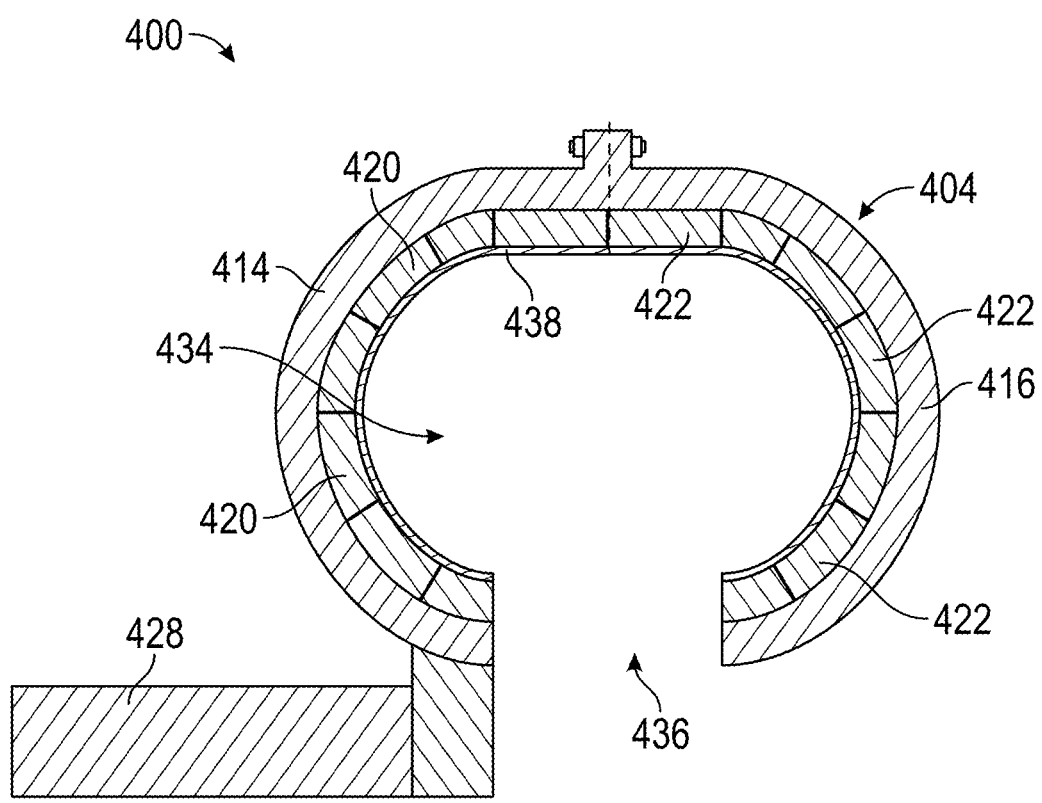
FIG. 4B is a schematic illustration of a rotor portion of the electric motor of FIG. 4A.

Turning now to FIGS. 4A-4B, schematic illustrations of a portion of an aircraft electric motor 400 in accordance with an embodiment of the present disclosure is shown. The electric motor 400 may be similar to that shown and described above, such as having cooling components, electronics, and the like, where are not shown again in detail for clarity and brevity. The electric motor 400 includes a stator 402 and a rotor 404. FIG. 4B illustrates the rotor 404 without the components of the stator 402 shown.

The stator 402 includes one or more windings 406 wound about a support structure 408. The stator 402 may be structurally supported on a stator support 410 which can include one or more stator connections 412 passing therethrough. The stator connections 412 may be configured to supply current into the windings 406 of the stator 402. The stator support 410 may be a structural component that does not rotate but rather is stationary relative to the rotor 404. The stator connections 412 can include electrical connections to pass a current through the windings 406 and/or fluid connections to supply cooling into the windings 406, such as described above. As shown in FIG. 4A, an annular heat exchanger 413 may be arranged radially outward from the rotor 404 (e.g., similar to that shown and described with respect to FIGS. 2A-2D). A cooling line 415 may be provided to fluidly couple the heat exchanger 413 with the windings 406 of the stator 402, with the cooling line 415 being one of the stator connections 412. The heat exchanger 413 may be mounted to or positioned external to a motor housing 417 that houses the stator 402, the rotor 404, and associated components as shown and described.

The rotor 404 includes a first rotor shell 414 and a second rotor shell 416 which form a rotor frame. The rotor shells 414, 416 are configured to be fixedly attached or connected, such as by a fastener 418, although clamps, clasps, and other joining mechanisms are possible without departing from the scope of the present disclosure. In other embodiments, the first rotor shell 414 and the second rotor shell 416 may be a single, unitary structure such that only a single rotor shell is provided.

The first rotor shell 414 supports a plurality of first magnet segments 420 and the second rotor shell 416 supports a plurality of second magnet segments 422. The magnet segments 420, 422 are arranged to be substantially symmetrical about the windings 406. That is, as shown in FIG. 4A, a longitudinal axis 424 and a radial axis 426 are defined through the windings 406, with the longitudinal axis 424 being parallel to a motor axis (e.g., parallel with a motor shaft 428) and the radial axis 426 being normal to the longitudinal axis 424 and parallel with an axis or line extending radially through the stator support 410. By arranging the magnetic components (e.g., magnet segments 420, 422) in a symmetrical manner about the winding 406, force balancing is achieved, thus preventing relative movement between the rotor 404 and the stator 402. It will be appreciated that the rotational movement of the rotor 404 relative to the stator 402 is maintained and permitted. However, movement that may impact a gap spacing (e.g., gap 430) between the windings 406 of the stator 402 and the magnet segments 420, 422 of the rotor 404 is reduced or eliminated through balancing of forces. Such balance of forces is achieved through creating symmetric magnetic fields about the winding 406.

As shown, the first rotor shell 414 may be fixedly connected to a motor shaft 428 that can be operably connected to another device or system, as will be appreciated by those of skill in the art. In some embodiments, the first rotor shell 414 may be integrally formed with the motor shaft 428. In other embodiments, the first rotor shell 414 may be fixedly attached to the motor shaft 428 by various known mechanisms, such as welding, bonding, fasteners, etc. As assembled, the first rotor shell 414, the second rotor shell 416, and the motor shaft 428 form a rotating body that is driven by interaction between the windings 406 (e.g., induced current) and the magnet segments 420, 422. As shown, the motor shaft 428 may be partially supported on the stator support 410 at one or more bearings 432.

Referring to FIG. 4B, the rotor 404 is shown without the stator 402 arranged therein. As shown, the rotor 404 is a substantially annular structure that defines an internal cavity 434. The internal cavity 434 of the rotor 404 is configured to receive the stator 402 and allow for rotation of the rotor 404 about the stator 402. The internal cavity 434 is defined, in part, by the magnet segments 420, 422 and includes an opening 436 that is sized to receive the stator support 410 and/or other components of the stator 402 and/or the electric motor 400.

Also shown in FIG. 4B (not shown in FIG. 4A for clarity), the rotor 404 may include a retention sleeve 438 that is configured to hold the magnet segments 420, 422 in place.

As such, the magnet segments 420, 422 may be held in place or mounted at an outer surface by the rotor shells 414, 416 and on an inner surface by the retention sleeve 438. The retention sleeve 438 may be sized to ensure the gap 430 is maintained during rotation of the rotor 404 relative to the stator 402. That is, the retention sleeve 438 may be of a thickness selected to not interfere with operation of the electric motor 400 (e.g., to not have contact between surfaces of the stator 402 and the rotor 404).

Although not shown in FIGS. 4A-4B, power modules, cooling components, electrical components, electronics, shafts, housings, and the like, as shown and described above, may be incorporated into the electric motor 400. In some embodiments, the cooling components can include a condenser that provides a cooling mechanism for a cooling fluid that is passed into and through the windings 406. Such condenser can be arranged radially outward from the rotor 404 and/or may be arranged axially adjacent or near the rotor, depending on the desired configuration and application. In some embodiments, an optional gear assembly 429 may be arranged between the rotor 404 and the motor shaft 428, as described above (e.g., as shown in FIG. 2D).

Figure 5:
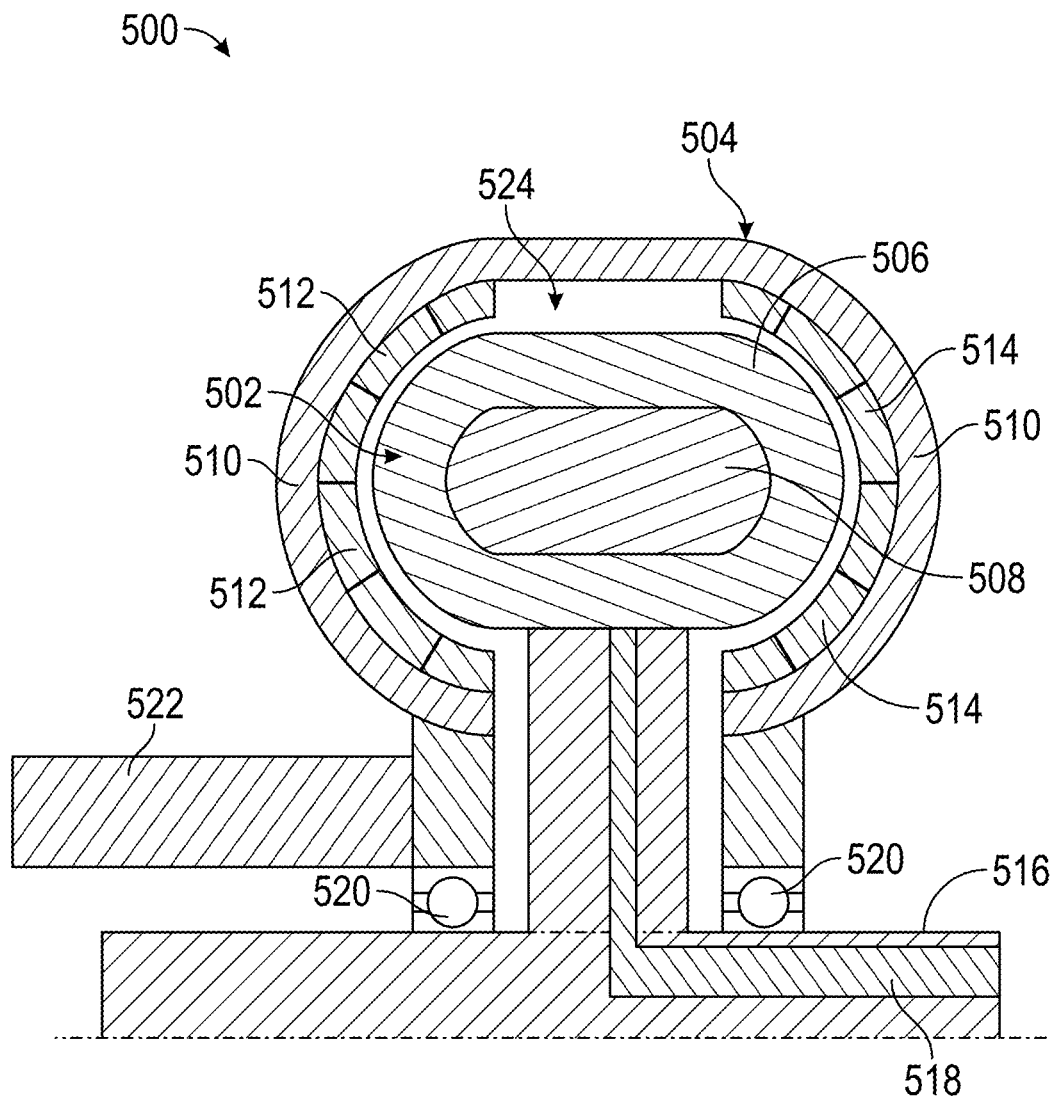
FIG. 5 is a schematic illustration of a portion of an electric motor in accordance with an embodiment of the present disclosure.

Turning now to FIG. 5, a schematic illustration of a portion of an aircraft electric motor 500 in accordance with an embodiment of the present disclosure is shown. The electric motor 500 may be similar to that shown and described above, such as having cooling components, electronics, and the like, where are not shown again in detail for clarity and brevity. The electric motor 500 includes a stator 502 and a rotor 504. The stator 502 being formed from one or more windings 506 about a support structure 508 and the rotor 504 being formed from a rotor shell 510 with a plurality of magnet segments 512, 514 arranged thereon. This configuration is substantially similar to that shown in FIGS. 4A-4B, and thus like features will not be described in detail again.

In this embodiment, a stator support 516 is arranged to support one or more stator connections 518. In this case the rotor shell 510 is a single, unitary structure, rather than the joined sections shown in FIGS. 4A-4B. Further, in this embodiment, two bearings 520 are arranged on opposite sides of the stator support 516 in the axial direction (e.g., parallel with a direction of a motor shaft 522). Additionally shown in this embodiment, the magnet segments 512, 514 are arranged symmetric about both axes, with a spacing 524 being defined opposite from the stator support 516 relative to the stator 502. This configuration may provide increased force balancing in both the radial and axial directions, if necessary. That is, in the illustrative configuration of FIG. 5, there may not be any force balance in a radial direction.

In accordance with embodiments of the present disclosure, the magnet segments are arranged about the end winding area of the windings (i.e., where the windings curve and wrap about the support structure of the stator. As a result, the end winding area can be engaged in torque production by introducing additional these magnets organized in an array mimicking a field distribution along the airgap at the sides. The magnet segments in the end winding section of the rotor may be segmented, as illustratively shown in FIGS. 4-5. In some embodiments. the magnets may fill in full the arch/curve corresponding to the end windings length (e.g., as shown in FIGS. 4-5). In other embodiments, one or more spaces may be present (e.g., one or more of the illustrative magnet segments may be removed or not present). In some such embodiments, the spaces may be arranged such that they are symmetric to each other to ensure force balancing of the rotor. In some embodiments, the magnets may be organized in a Halbach array along the circumference of the curvature of the rotor shell(s) and/or sleeve(s). Further, in some embodiments, the end turn section of the rotor may consist of magnets with different material, thickness, or energy product (magnet's strength), or the like. Such variation in the magnets may be selected to achieve a desired force balancing of the rotor.

In the embodiments of FIGS. 4-5, the stator support is arranged radially inward from the stator. However, such configuration is not intended to be limiting. For example, the force balance achieved by embodiments of the present disclosure may be achieved through a radially exterior support of the stator.

Figure 6:
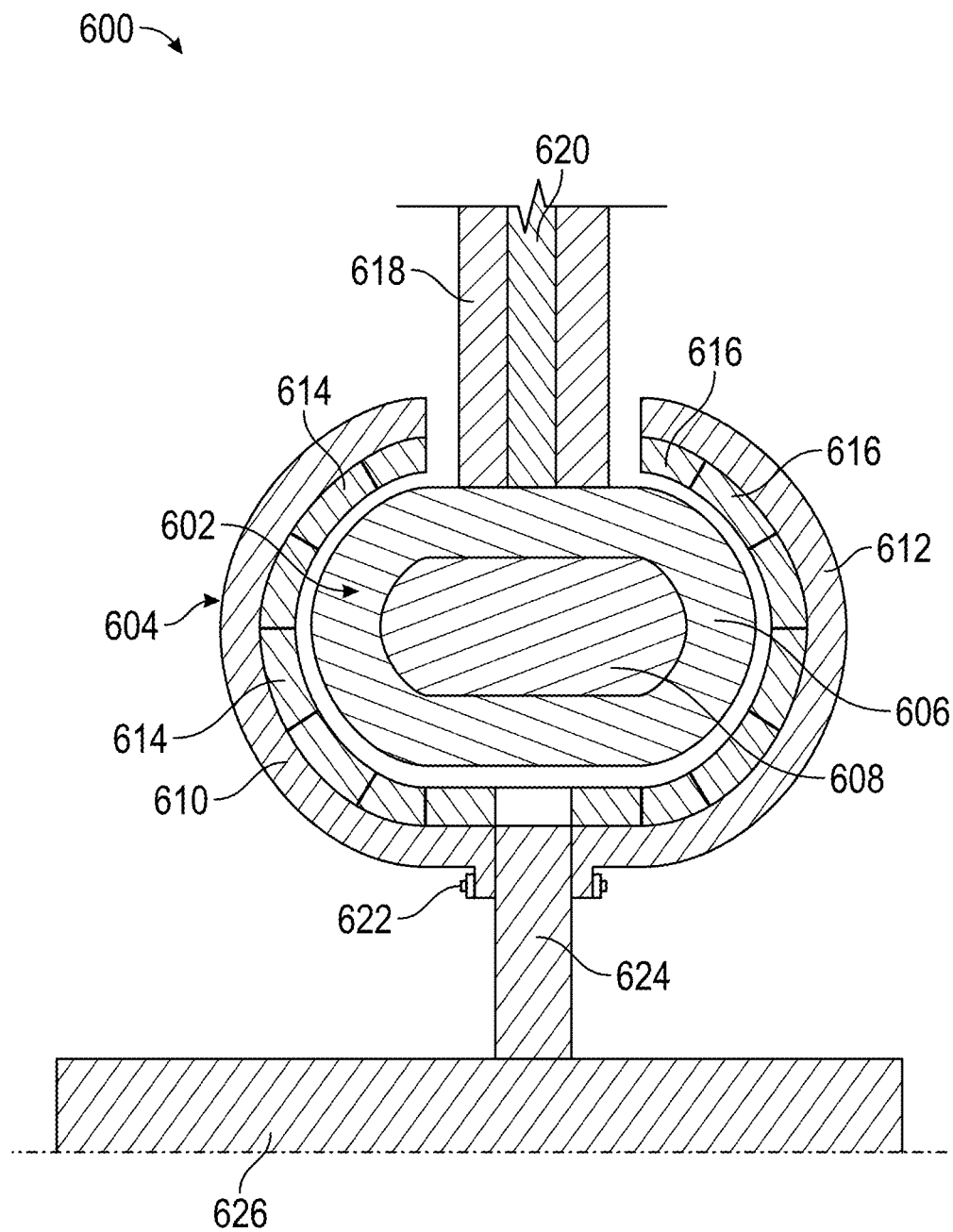
FIG. 6 is a schematic illustration of a portion of an electric motor in accordance with an embodiment of the present disclosure.

Turning now to FIG. 6, a schematic illustration of a portion of an aircraft electric motor 600 in accordance with an embodiment of the present disclosure is shown. The electric motor 600 may be similar to that shown and described above, such as having cooling components, electronics, and the like, where are not shown again in detail for clarity and brevity. The electric motor 600 includes a stator 602 and a rotor 604. The stator 602 is formed from one or more windings 606 about a support structure 608 and the rotor 604 is formed from two rotor shells 610, 612 with a plurality of magnet segments 614, 616 arranged thereon. As shown in FIG. 6, a stator support 618 is arranged radially outward from the stator 602 and supports one or more stator connections 620. In this arrangement, force balance is achieved through a symmetry of the magnet segments 614, 616 about the windings 606. The rotor shells 610, 614 are coupled together by a fastener 622 to a shaft connection 624 which in turn connects to a motor shaft 626.

In this arrangement, the rotor 604 is open on outer circumference to allow structural support of the stator 602. Such configuration may reduce a length of the stator connections 620 (e.g., reduced distance between the stator and a heat exchanger located on the outer circumference of the machine). In this arrangement, the rotor 604 is directly connected to the motor shaft 626 at the shaft connection 624. In some embodiments, the shaft connection 624 can include one or more bearings, if necessary. In the above described embodiments, the motor shaft may be operably coupled to a propeller or the like. In some embodiments, the motor can be attached to the propeller through a motor shaft or, in other embodiments, the propeller can be integrated with outer shell of the rotor (frame, shell(s), or sleeve(s)).

In the embodiments of FIGS. 4-6, the windings are arranged as dominant radial flux arrangements. However, such configurations are not to be limiting to the present disclosure. That is, in accordance with some embodiments of the present disclosure, a dominant axial flux stator may be employed.

Figure 7:
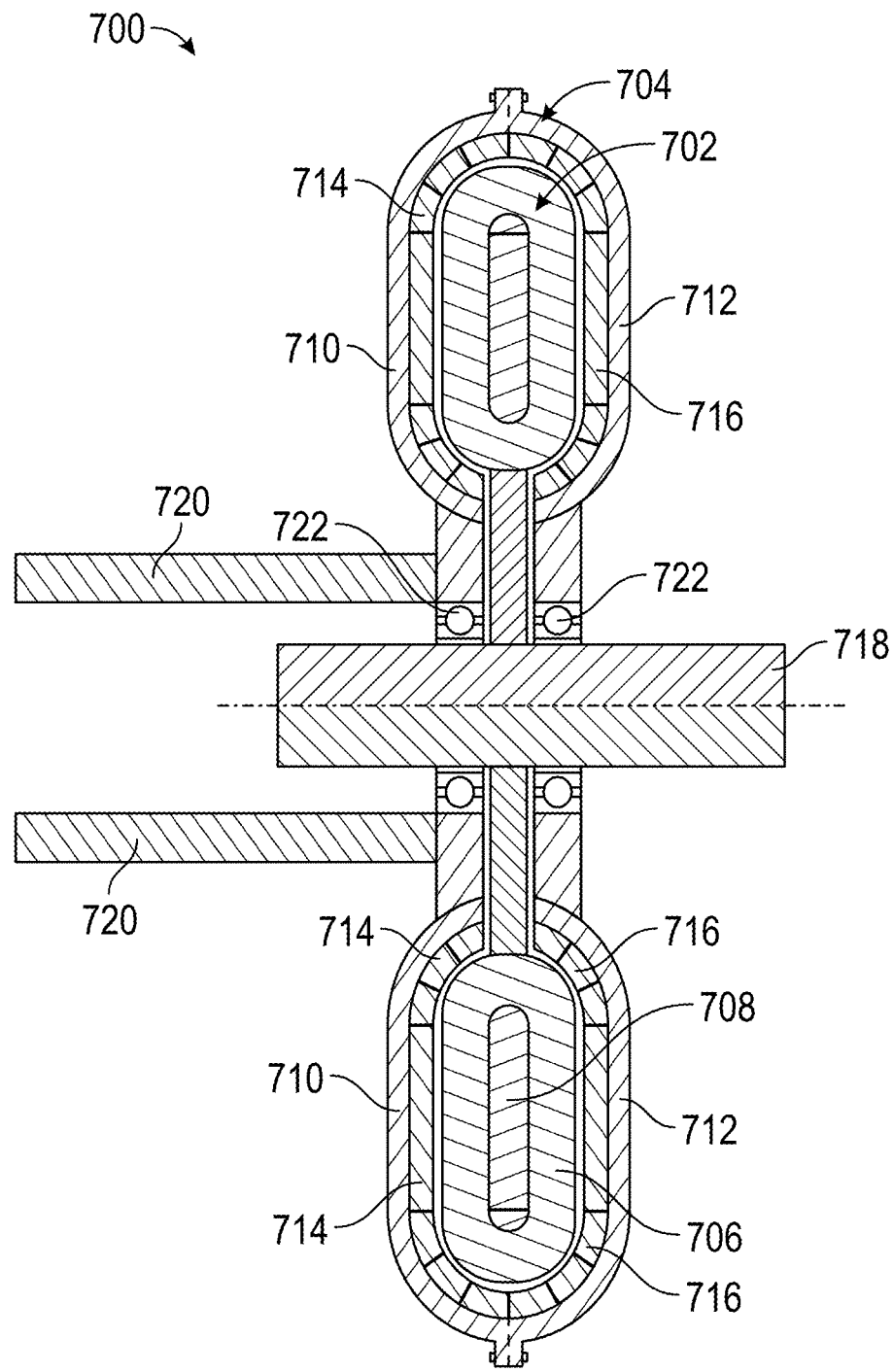
FIG. 7 is a schematic illustration of a portion of an electric motor in accordance with an embodiment of the present disclosure.

For example, referring to FIG. 7, a schematic illustration of a portion of an aircraft electric motor 700 in accordance with an embodiment of the present disclosure is shown. The electric motor 700 may be similar to that shown and described above, such as having cooling components, electronics, and the like, where are not shown again in detail for clarity and brevity. The electric motor 700 includes a stator 702 and a rotor 704. The stator 702 is formed from one or more windings 706 about a support structure 708 and the rotor 704 is formed from two rotor shells 710, 712 with a plurality of magnet segments 714, 716 arranged thereon. As shown in FIG. 7, a stator support 718 is arranged radially inward from the stator 702 and supports one or more stator connections (not shown in this embodiment). In this arrangement, force balance is achieved through a symmetry of the magnet segments 714, 716 about the windings 706.

The rotor shells 710, 714 are coupled together and to a motor shaft 720. One or more bearings 722 may be provided to decouple relative movement between the stator components and the rotor components.

In this configuration, the windings 706 of the stator 702 and the magnets 714, 716 of the rotor 704 are arranged in a dominant axial flux arrangement. As will be appreciated by those of skill in the art, the orientation of such components may provide for a narrower electric motor in an axial direction, although the radial extent may be increased due to such arrangement.

It will be appreciated that the above described embodiments are merely for illustrative and explanatory purposes and are not intended to be limiting to the specific components and arrangements described and shown. For example, various of the embodiments can include features not explicitly shown, such as cooling systems, power systems, retention sleeves, components coupled to and driven by the output shaft, and the like. Further, it will be appreciated that the specific arrangement of magnet segments may be varied depending on the specific application, including where gaps or spaces (e.g., no magnet present along a portion of a shell) in the arrangement of magnets may be selected to achieve a desired torque and/or force balancing or based on other considerations as will be appreciated by those of skill in the art.

Figure 8:
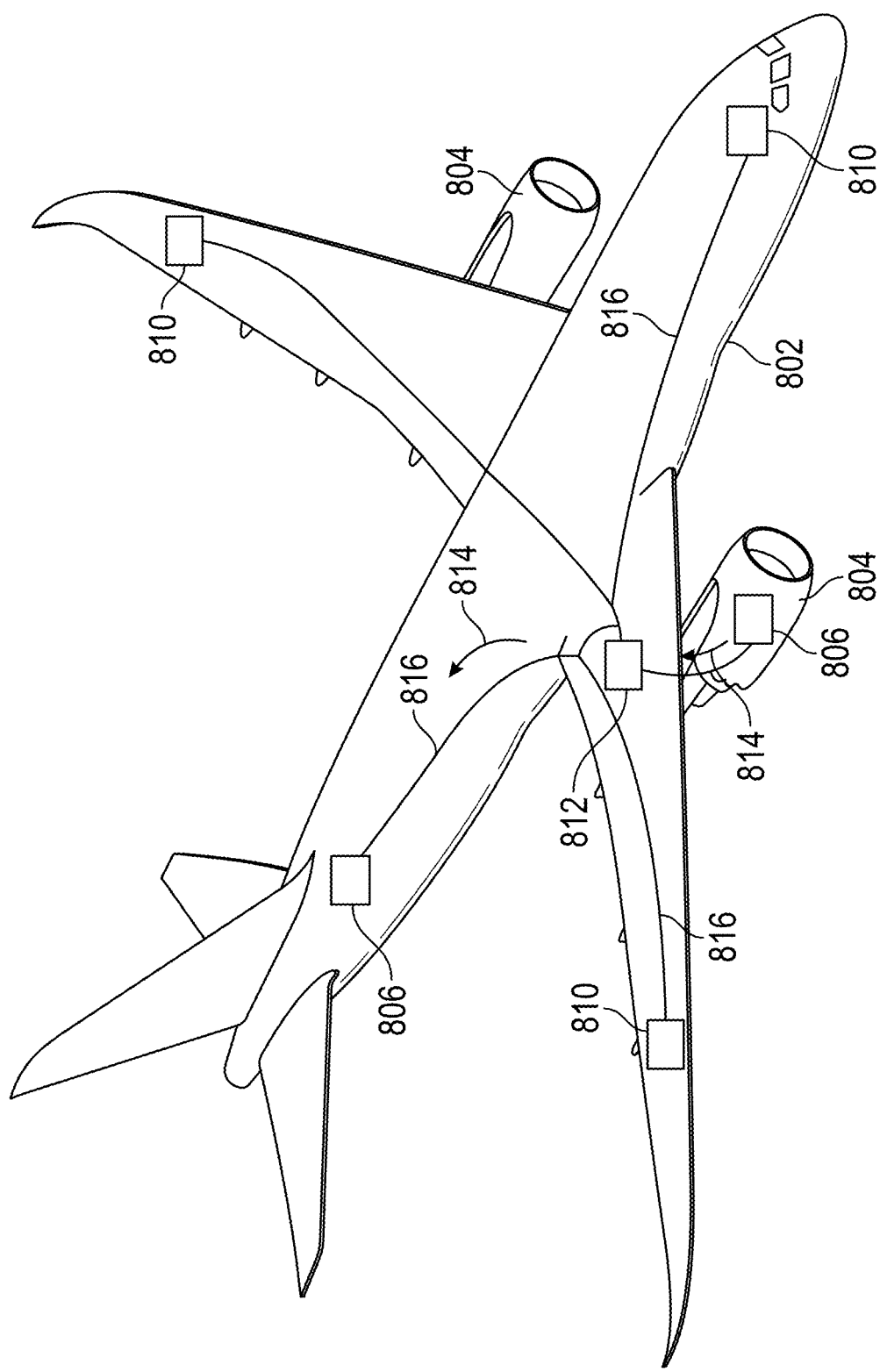
FIG. 8 is a schematic view of a power system of an aircraft that may employ embodiments of the present disclosure.

Referring to FIG. 8, a power system 800 of an aircraft 802 is shown. The power system 800 includes one or more engines 804, one or more electric motors 806, a power bus electrically connecting the various power sources 804, 806, and a plurality of electrical devices 810 that may be powered by the engines 804 and/or motors 806. The power system 800 includes a power distribution system 812 that distributes power 814 through power lines or cables 816. The electric motors 806 be configured as the aircraft electric motors shown and described above.

Advantageously, embodiments of the present disclosure provide for improved electric motors for aircraft and aviation applications. The aircraft electric motors of the present disclosure employ force balancing through arrangement of magnets relative to stator windings to ensure that the rotor does not move into contact with the stator components. Such configurations, as described herein, can provide for improved power density electric machines and increase reliability. Further, unbalanced loads may be avoided, thus improving component life and power generation efficiencies. Furthermore, through the stator connections and supports, improved and stable electrical and thermal connections may be provided. Additionally, by incorporating magnets about the end windings (e.g., at the curves/turns), increase torque may be achieved along with both low and medium speed operations, which may rely upon such increased torque.

As described herein, embodiments of the present disclosure may provide for light-weight components. The light-weight materials, described above, can be used to form the specifically described components of the motor and/or other parts/components of the motors described herein. It will be appreciated that composite materials of the present disclosure can include, without limitation, composite with woven fabric, composite with braided fabric, composite with carbon fiber, composite with glass fiber, composite aramid fiber, composite with multiple type of fibers, composite with short fibers, and/or composite with continuous fibers. Such composite materials may be incorporated into system that also use metals which may include, without limitation, titanium, titanium alloys, aluminum, aluminum alloys, iron, stainless steel, Inconel. It will be appreciated that other metals and/or composite materials may be employed without departing from the scope of the present disclosure.

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric motor comprising:
a rotor comprising a plurality of magnet segments arranged on a frame of the rotor, the rotor being an annular structure defining an internal cavity within the plurality of magnet segments;
an output shaft arranged radially inward from the rotor and operably coupled to the rotor, the output shaft defining a motor axis;
a stator comprising at least one winding wrapped about a support structure, the stator arranged within the internal cavity of the rotor; and
a stator support comprising a portion extending radially inward from the support structure and a portion extending parallel with the output shaft, the stator support configured to supply at least a current into the at least one winding, wherein the support structure of the stator is structurally supported on the stator support;
wherein the magnet segments are symmetrically arranged about the stator to balance axial forces applied to the rotor when a current is induced within the at least one winding and maintain a gap between the plurality of magnet segments and the at least one winding,
wherein the at least one winding defines a longitudinal axis that is parallel to the motor axis and a radial axis that is normal to the longitudinal axis and parallel with an axis or line extending radially through the stator support,
wherein the symmetrical arrangement of the magnet segments creates a symmetric magnetic field about the at least one winding, and the output shaft is supported on the stator support at one or more bearings.

2. The aircraft electric motor of claim 1, wherein the frame of the rotor comprises a first rotor shell and a second rotor shell coupled to each other, wherein the plurality of magnet segments are supported on the first and second rotor shells.

3. The aircraft electric motor of claim 2, further comprising a fastener configured to join the first rotor shell to the second rotor shell.

4. The aircraft electric motor of claim 1, wherein the frame comprises an opening on a radially interior side and the stator support extends radially inward from the stator.

5. The aircraft electric motor of claim 1, wherein the frame is supported on one side in a cantilevered arrangement to the output shaft.

6. The aircraft electric motor of claim 1, wherein the stator support comprises one or more stator connections.

7. The aircraft electric motor of claim 6, wherein the one or more stator connections include an electrical connection and a cooling fluid connection.

8. The aircraft electric motor of claim 1, wherein the at least one winding and the plurality of magnet segments are arranged to have a dominant axial flux.

9. The aircraft electric motor of claim 1, further comprising a cooling system comprising an annular heat exchanger arranged about the rotor.

10. The aircraft electric motor of claim 9, further comprising a motor housing arranged radially inward from the heat exchanger, the motor housing defining a rotor-stator cavity with the rotor and stator arranged therein.

11. The aircraft electric motor of claim 1, further comprising a gear assembly arranged to operably couple the rotor to the output shaft.

12. The aircraft electric motor of claim 1, further comprising at least one power module system configured to control operation of the aircraft electric motor.

13. The aircraft electric motor of claim 1, further comprising a cooling system comprising a header configured to direct cooling fluid to the one or more windings of the stator from a heat exchanger.

14. The aircraft electric motor of claim 13, further comprising a pump configured to circulate the cooling fluid through the header and the heat exchanger.

15. An aircraft comprising:
at least one engine; and
at least one electric motor configured to rotationally drive a component of the aircraft, the at least one electric motor comprising:
a rotor comprising a plurality of magnet segments arranged on an interior surface of a frame of the rotor, the rotor being an annular structure defining an internal cavity within the plurality of magnet segments;
an output shaft arranged radially inward from the rotor and operably coupled to the rotor and configured to be rotationally driven by rotation of the rotor, the output shaft defining a motor axis;
a stator comprising at least one winding wrapped about a support structure, the winding arranged within the rotor; and
a stator support comprising a portion extending radially inward from the support structure and a portion extending parallel with the output shaft, the stator support configured to supply at least a current into the at least one winding, wherein the support structure of the stator is structurally supported on the stator support;
wherein the magnet segments are symmetrically arranged about the stator to balance axial forces applied to the rotor when a current is induced within the at least one winding and maintain a gap between the plurality of magnet segments and the at least one winding,
wherein the at least one winding defines a longitudinal axis that is parallel to the motor axis and a radial axis that is normal to the longitudinal axis and parallel with an axis or line extending radially through the stator support,
wherein the symmetrical arrangement of the magnet segments creates a symmetric magnetic field about the at least one winding, and
the output shaft is supported on the stator support at one or more bearings.

16. The aircraft of claim 15, wherein the frame of the rotor comprises a first rotor shell and a second rotor shell coupled to each other, wherein the plurality of magnet segments are supported on the first and second rotor shells.

17. The aircraft of claim 15, wherein the frame comprises an opening on a radially interior side and the stator support extends radially inward from the stator.

18. The aircraft of claim 15, wherein the frame comprises an opening on a radially exterior side and the stator support extends radially outward from the stator.

19. The aircraft of claim 15, wherein the at least one winding and the plurality of magnet segments are arranged to have a dominant axial flux.

* * * * *